Figure 1:
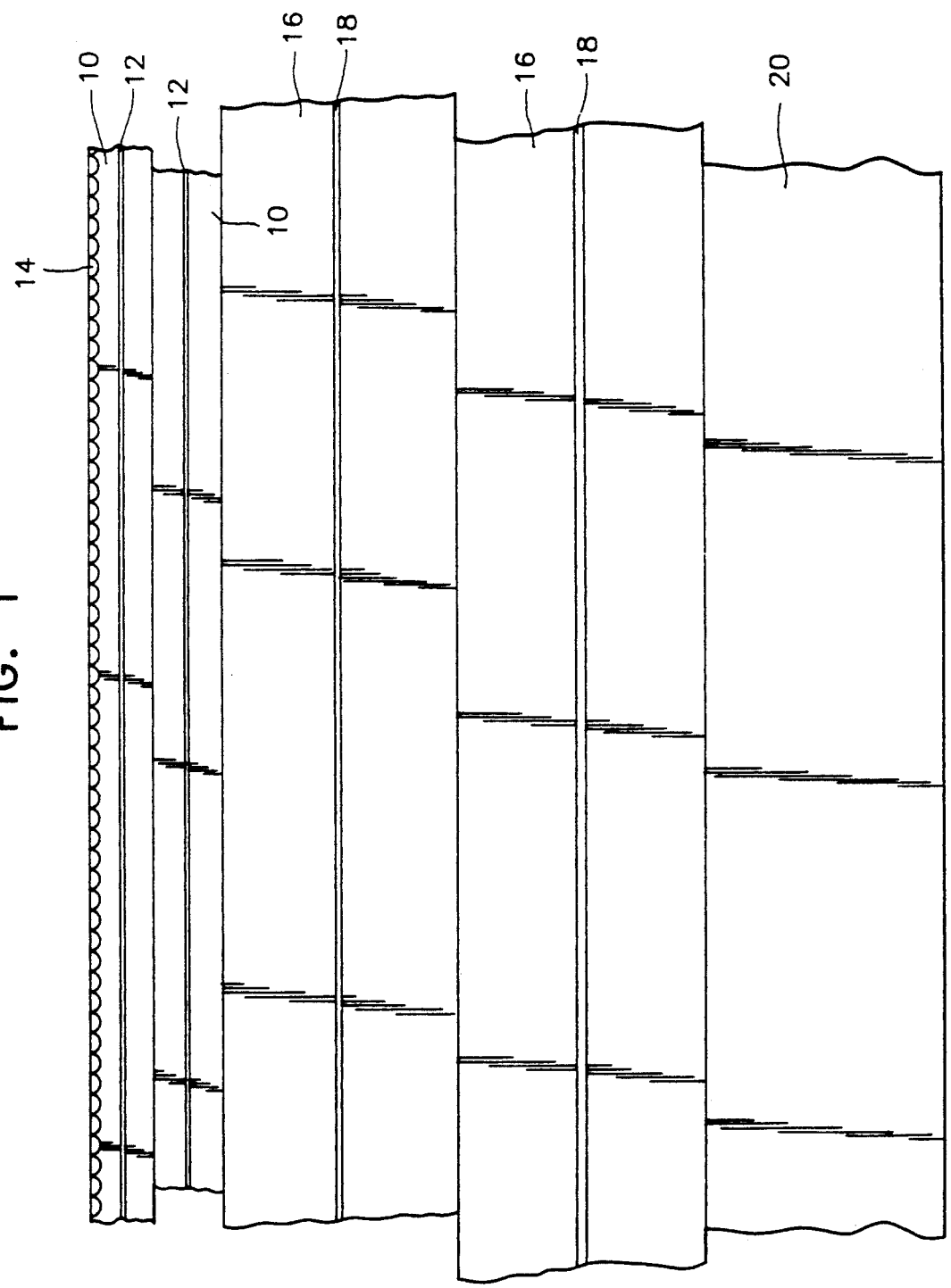

United States Patent [19]

Berkman

[11] Patent Number: 5,200,853
[45] Date of Patent: Apr. 6, 1993

[54] BOARD FOR SCREENING AND WRITING AND A METHOD FOR THE PRODUCTION THEREOF

[76] Inventor: Opher Berkman, 13 Shmuel Hanagid Street, Herzaliyah, Israel, 46498

[21] Appl. No.: 840,151

[22] Filed: Feb. 24, 1992

[30] Foreign Application Priority Data

Oct. 31, 1991 [IL] Israel .......................................... 99916

[51] Int. Cl.$^5$ ............................................. G03B 21/56
[52] U.S. Cl. .................................................... 359/443
[58] Field of Search ................ 359/443, 447; 353/122; 355/43

[56] References Cited

U.S. PATENT DOCUMENTS

| | | | |
|---|---|---|---|
| 2,528,311 | 10/1950 | Hurley | 359/443 |
| 4,648,706 | 3/1987 | Shibasaki et al. | 355/43 |
| 4,905,040 | 2/1990 | Nagai et al. | 355/43 |
| 5,033,843 | 7/1991 | Kolff | 353/122 |

FOREIGN PATENT DOCUMENTS

53855 3/1992 Israel .

*Primary Examiner*—Richard A. Wintercorn
*Attorney, Agent, or Firm*—Jacobson, Price, Holman & Stern

[57] ABSTRACT

The invention provides a durable multipurpose screenboard especially adapted for both the screening of projected images and for writing thereon, wherein the screenboard comprises an upper section, a core section and a base section, the upper section comprising at least two superposed layers of transparent overlay sheets, each of the sheets weighing between 20 and 120 grams per square meter and having been soaked in a solution or melt of a polymeric resin material to subsequently form an intermediate solid plastic layer, the upper surface of the upper sheet being roughened by a plurality of closely-spaced complementary depressions of depth between 0.01 mm and 0.2 mm, the core section comprising at least one paper sheet weighing between 60 and 140 grams per square meter and having been soaked in a solution or melt of a polymeric resin material to subsequently form an intermediate solid plastic layer, and the base section comprising a plastic sheet, the screenboard having a surface being adapted to both reduce glare of projected images and to erasably retain particles from writing implements pressed therealong.

19 Claims, 1 Drawing Sheet

BOARD FOR SCREENING AND WRITING AND A METHOD FOR THE PRODUCTION THEREOF

The present invention relates to a multi-purpose screenboard. More particularly, the present invention relates to a durable screenboard having surprisingly superior properties when compared with prior art screens, and to a method for producing this screenboard, and constitutes a modification of and an improvement on the invention described in Israel patent 53855.

In Israel Patent 53855 there is described and claimed a method for preparing a multipurpose screenboard especially adapted for both screening of projected images and writing, wherein said screenboard comprises a rigid sheet of thermoplastic material, said process comprising placing said plastic sheet in a press for about 90 to about 150 minutes at a temperature of about 130 to 200° C. and at a pressure of about 50 to about 200 kg/cm$^2$, wherein at least one of the surfaces of said plastic sheet is pressed against a molding sheet having a plurality of closely spaced projections, said projections having a height of about 0.02 to about 0.2 mm, whereby at least one of the surfaces of said screenboard is roughened and there is produced thereon a plurality of closely spaced complementary depressions which result in said screenboard surface being adapted to both reduce glare of projected images and to erasably retain chalk particles from chalk writing implements pressed therealong.

While the aforementioned patent mainly describes a thermoplastic screenboard, the use of thermosetting resin for this purpose is also taught thereby and included therein, since it is known that many plastics which in their final state are characterized as being thermoset are thermoplastic in character before being cured and thus can be imprinted with a molding sheet while in said thermoplastic state.

It is one of the objects of the present invention to provide for a screenboard having greatly improved optical properties. It is a second object of the present invention to provide for a durable screenboard, wherein the roughened surface of the screenboard will retain its texture, roughness and shape despite years of abrasion against chalk particles. A third object of the present invention is to enhance damage resistance which might be caused by a sharp instrument. A fourth object is to enhance the chemical resistance of the screenboard to enable the screenboard to be used in chemical laboratories. A fifth object of the present invention is to propose a screen which will resist distortion even when subjected—accidentally or wantonly to high temperatures. Yet a further object is to provide a writing surface which accepts marking by felt-tip pens and yet can be erased by the use of a cloth.

These objects are achieved, and the desirable features of the screenboard described in Israel Patent 53855 are retained, by providing a durable multipurpose screenboard especially adapted for both the screening of projected images and for writing thereon, wherein said screenboard comprises an upper section, a core section and a base section, said upper section comprising at least two superposed layers of transparent overlay sheets, each of said sheets weighing between 20 and 120 grams per square meter and being soaked in a solution or melt of a polymeric resin material which will subsequently form a transparent solid plastic layer, the upper surface of the upper sheet being roughened by a plurality of closely spaced complementary depressions of depth between 0.01 and 0.2 mm, said core section comprising at least one paper sheet weighing between 60 and 140 grams per square meter, and being soaked in a solution or melt of a polymeric resin material, said based section comprising paper impregnated with phenolic resins, whereby a screenboard is produced having a surface being adapted to both reduce glare of projected images and to erasably retain particles from writing implements pressed therealong.

The manufacture of laminated thermoset sheets based on Melamine-formaldehyde is widely practiced, such sheets often being referred to by the tradename "Formica". The present invention differs from this material in several aspects, the most important being in the use of a plurality of transparent layers in the upper section, and the optimization of the size and spacing of the recesses molded into the upper surface of the screen, these features making a substantial contribution to the formation of a screenboard which gives a sharp picture of outstanding color fidelity, is visible at an acute angle, has a depth of image creating an almost three-dimensional effect and is practically free of glare, thereby making pleasant the viewing of projected pictures and preventing strain in the eyes of the person viewing the picture.

Optical tests have been carried out with a screenboard made according to the present invention, and the results, which are given further on, indicate a substantial improvement over those obtained with a screenboard made according to Israel Patent 53855. The present screenboard is also shown to be superior to a screenboard made from formica-like material but with only the normal single layer of upper transparent melamine coated transparent overlay sheets.

Test Results

Four sample boards marked by numbers were given to an independent photographic laboratory for test. No information regarding the nature of the screenboards or the purpose of the tests was given to the test laboratory.

The following boards were submitted for test:

| Marking | Type of Board | Colour |
| --- | --- | --- |
| 0/0 | Formica | Light Green |
| 1/1 | Single upper layer, as per Israel Patent 53855 | Dark Green |
| 2/2 | Two upper layers, as per the present invention | Dark Green |
| 3/3 | Three upper layers, as per the present invention | Dark Green |

Only the marking and color were known to the test laboratory.

The light source in all tests was a 150 watt point source 1900 lux, used at 4 meters range.

The lightmeter used was a Gossen-Master Six using the photomatic method.

Test 1

Light source perpendicular, lightmeter measurement at various angles. Room illumination 120 lux.

| Screenboard No. | Light reflected, lightmeter at angle: | | | | | |
| --- | --- | --- | --- | --- | --- | --- |
|  | 0° | 15° | 30° | 45° | 60° | 75° |
| 0/00 | 400 | 350 | 280 | 230 | 170 | 150 |
| 1/1 | 370 | 320 | 270 | 210 | 200 | 180 |

-continued

| Screenboard No. | Light reflected, lightmeter at angle: | | | | | |
|---|---|---|---|---|---|---|
| | 0° | 15° | 30° | 45° | 60° | 75° |
| 2/2 | 400 | 370 | 300 | 280 | 260 | 190 |
| 3/3 | 460 | 400 | 320 | 300 | 260 | 210 |

Test 2

Lightmeter perpendicular, light source varied. Room illumination 120 lux. Results reported in percentage of reflected light obtained from perpendicular light source.

| Screenboard | Perpendicular | 15° | 30° | 45° | 60° | 75° |
|---|---|---|---|---|---|---|
| 0/0 | 100% | 87.5 | 70.0 | 57.5 | 42.5 | 37.5 |
| 1/1 | 100% | 86.5 | 80.0 | 56.75 | 54.0 | 40.54 |
| 2/2 | 100% | 92.5 | 75.0 | 70.0 | 65.0 | 47.5 |
| 3/3 | 100% | 86.9 | 69.56 | 65.22 | 56.52 | 45.65 |

Test 3

Colour reflection in lighted room. A test slide was used, composed of gelatine filters made by Kodak and suitable for use with a Halogen light source. Six colour filters were used: Cyan, magenta, yellow, blue, green and red. Results:

"When the lights were turned on in the project (Eight 60 watt incandescent lights plus 3 mercury lights, total 120 lux) it was found that the colour fidelity and freshness were best on board 3/3. The colours were almost neutral, being only slightly influenced by the colour of the board. However boards 0/0, 1/1 and 2/2 showed much more colour distortion."

End of Test Report

As can be clearly seen from Test 1, board 2/2 and 3/3 which were made according to the present invention allow viewing from acute angles and show a dramatic improvement over boards 0/0 and 1/1 particularly in the 45°–60° range. In this range also, Test 2 shows similar results, with board 2/2 being best. With regard to colour fidelity, the words of the test laboratory regarding Test no. 3 require no further comment.

In classroom situations, the practical result of this unexpectedly superior property is that students in fact will not need to leave their regular seats and regroup in the middle of a classroom for viewing screened material. Furthermore, since effective viewing area is appreciably increased, the number of possible viewing participants is also increased.

The multipurpose screenboard produced according to the method of the present invention is thus a versatile screen suitable for many screening uses, including classroom and teaching situations.

It is to be noted that the presently known "blackboard" which is commonly used in schools is known to be a very poor screening surface with much image distortion and loss, which poor screening properties were always attributed to the roughened surface character of the blackboard, and thus it was especially surprising that the chalk retaining depressions of the present screenboard did not exhibit similar poor screen properties.

It is possible and preferred to manufacture the screenboard with a perforated sheet of ferromagnetic metal having a width of about 0.1 and 2 mm laminated between said base layer and said core layer of the screenboard to enable the attachment of magnetic bodies to the surface of said screenboard and thereby to further expand the multifunctionality thereof as a teaching aid.

In practice such a metal sheet could be embedded between two plastic sheets during the extrusion thereof through the extrusion rollers, or could be sandwiched between two such sheets after they have emerged from the extrusion rollers.

Furthermore it is possible to mix iron oxide or other ferromagnetic powder with the plastic pellets before extrusion.

Furthermore, as will be realized, in addition to the possibility of writing with chalk, the screenboard is also adapted to be written upon with much better writing instruments such as oil, water and alcohol pencils which allow subsequent erasure using different known cleaning materials.

While the screenboard of the present invention was originally conceived of as a teaching aid, it has also been found to have several surprising properties which, while not yet fully explored, appear to have both commercial and military application.

Thus, it has been found that infra-red pictures projected on said screen are viewable without the need for special glasses; projection of laser and holiograph pictures were viewable on said screen; and said screen can be used for underwater writing by skin-divers and/or frogmen without the water interfering with the writing process.

The invention will now be described in connection with certain preferred embodiments with reference to the following illustrative figures so that it may be more fully understood.

With reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawing:

FIG. 1 shows a fragmentary and vastly enlarged cross-section of the screenboard made according to the invention, the total thickness of which is between 2 and 7 mm.

In the upper sector a number of layers 8 are composed of polymer and resin impregnated or coated sheets 12 wherein said polymer 10 is preferably melamine-formaldehyde. Preferably there are two or three such layers, wherein each such layer 8 contains a transparent overlay sheet 12, composed of paper weighing between 20 and 120 grams per square meter, and preferably 35 to 100 grams per square meter. The outer surface of the polymer 10 is distorted by a large number of closely-spaced depressions 14. Depressions 14 are preferably arranged in a geometrically orderly array, preferably have rounded, concave bottoms, and are preferably spaced together very closely, such that adjacent depressions share a common wall. The depth of the depressions 14 is at least 0.01 mm and not more than 0.2 mm, the preferred range being between 0.04 mm and 0.08 mm. Underneath the upper section and bonded thereto is the core section, which is composed of at least one paper sheet 18 weighing between 60 and 140 grams per square meter which was soaked in a solution or melt of a polymeric resin material to subsequently form an intermediate solid plastic layer as stated. Each plastic layer contains a paper sheet 18, the colour of the upper sheet corresponding to the colour which is chosen as the desired screenboard colour. For example, if the screen is to be used primarily for the purpose of writing thereon with white chalk, the preferred colour will be green. If the primary application of the screen is to be for the projection of picture slides, white will be chosen. The preferred types of paper sheet 18 are kraft or crepe, weighing between 80 and 120 grams per square meter, preferably 110 gram per square meter.

A plastic base section 20 is molded under the core section. While a wide range of plastics, whether thermoset or thermoplastic, are suitable for use in the base section 20, it is advantageous to use a phenolic thermoset plastic, as this material provides high strength, rigidity and thermal ability at moderate cost.

In a second embodiment of the invention, ferromagnetic material is included in the laminate, which results in a screenboard whereon magnetic bodies may be attached. The preferred form of this material is perforated sheet, this being positioned anywhere in the laminate but below the upper paper of the core sheet. In a further embodiment, the form in which the ferromagnetic material is added is as a powder, such as iron oxide powder, and the layer to which it is added is any layer below the upper of the core layers.

In yet a further embodiment, small magnetic bodies are inserted in any layer below the upper layer in the core section. The screenboard resulting will attract iron or iron-containing bodies, a feature useful for display purposes.

A method for the production of the screenboard will now be described. All the materials described are positioned on the lower platen of a large heated press, the thermosetting materials being in a condition prior to complete cure. Flow modifiers have been added to the upper layers of transparent thermosetting resins. A molding sheet provided with a plurality of closely-spaced projections having a height of about 0.01 mm to 0.2 mm is preferably coated with a release agent and then laid on the upper surface of the laminate. Pressure of 50 to 800 kg per square centimeter is applied for about 20 to 60 minutes at a temperature of 100° to 170° C. At the completion of the cycle, the molding sheet is removed from the laminate and the laminate cooled to room temperature.

The molding sheet employed may be of any of several forms. In a first embodiment the upper plate of the heated press, made preferably of stainless steel, may be provided with the said projections and itself serves the purpose of the molding sheet. In a second embodiment, the molding sheet is a roughened aluminum foil provided with an array of projections. In a third embodiment, the molding sheet is bi-oriented polypropylene of a heat resistant grade and provided with projections, sheet thickness being between 15 and 100 microns.

It will be evident to those skilled in the art that the invention is not limited to the details of the foregoing illustrative embodiments, and that the present invention may be embodied in other specific forms without departing from the essential attributes thereof, and it is therefore desired that the present embodiments be considered in all respects as illustrative and not restrictive, reference being made to the appended claims, rather than to the foregoing description, and all changes which come within the meaning and range of equivalency of the claims are therefore intended to be embraced therein.

What is claimed is:

1. A durable multipurpose screenboard especially adapted for both the screening of projected images and for writing thereon, wherein said screenboard comprises an upper section, a core section and a base section, said upper section comprising at least two superposed layers of transparent overlay sheets, each of said sheets weighing between 20 and 120 grams per square meter and having been soaked in a solution or melt of a polymeric resin material to subsequently form an intermediate solid plastic layer, the upper surface of the upper sheet being roughened by a plurality of closely-spaced complementary depressions of depth between 0.01 mm and 0.2 mm, said core section comprising at least one paper sheet weighing between 60 and 140 grams per square meter and having been soaked in a solution or melt of a polymeric resin material to subsequently form an intermediate solid plastic layer, and said base section comprising a plastic sheet, said screenboard having a surface being adapted to both reduce glare of projected images and to erasably retain particles from writing implements pressed therealong.

2. A screenboard as claimed in claim 1, wherein said polymeric resin material is Melamine.

3. A screenboard as claimed in claim 1, wherein said transparent overlay sheets weight between 35 and 100 grams per square meter.

4. A screenboard as claimed in claim 1, wherein said upper section comprises three superposed layers of transparent overlay sheets.

5. A screenboard as claimed in claim 1, wherein the bottoms of said depressions are concavely rounded.

6. A screenboard as claimed in claim 1, wherein the inner surfaces of said depressions are roughened.

7. A screenboard as claimed in claim 1, wherein said depressions are arrayed adjacent to each other along said surface and at least a section of the ridges of adjacent depressions form a common wall for said adjacent depressions.

8. A screenboard as claimed in claim 1, wherein said paper sheets in said core section are crepe paper.

9. A screenboard as claimed in claim 1, wherein said paper sheets in said core section are kraft paper.

10. A screenboard as claimed in claim 1, wherein the uppermost of said paper sheets in said core layer is coloured green, whereby the screenboard produced is particularly useful as a writing surface.

11. A screenboard as claimed in claim 10, wherein said core layer is coloured dark green.

12. A screenboard as claimed in claim 1, wherein the uppermost of paper sheets in said core layer is coloured white, whereby the screenboard produced is particularly useful as a surface for the projection of pictures.

13. A screenboard as claimed in claim 1, wherein said plastic sheet comprising said base section is a thermoplastic.

14. A screenboard as claimed in claim 1, wherein said plastic sheet comprising said base section is a phenolic thermosetting resin.

15. A screenboard as claimed in claim 1, further comprising a perforated sheet of ferromagnetic metal, said perforated sheet being positioned above said base layer but below the upper layer of said core layer, whereby it is enabled to attach magnetic bodies to said screenboard.

16. A method for preparing a durable multipurpose screenboard, wherein the materials as described in claim 1 are placed in a heated press from about 20 to about 60 minutes at a temperature of about 100° to 170° C. and at a pressure of about 50 to about 800 kg. per square centimeter, wherein said outer layer is pressed against a molding sheet having a plurality of closely spaced projections, said projections having a height of about 0.02 to about 0.2 mm, whereby at least said upper section of said screenboard is roughened and there is produced thereon a plurality of closely spaced complementary depressions which result in said screenboard surface being adapted to both reduce glare of projected images and to erasably retain particles from writing instruments pressed therealong.

17. A method for preparing a screenboard as claimed in claim 16, wherein said molding sheet is a roughened sheet of aluminum foil provided with a plurality of closely-spaced projections.

18. A method for preparing a screenboard as claimed in claim 16 wherein said molding sheet is oriented polypropylene in a thickness of about 15 to about 100 microns.

19. A method for preparing a screenboard as claimed in claim 16, wherein flow improvement additives are mixed into the outer layer of said transparent thermoplastic.

* * * * *